United States Patent [19]

Olson et al.

[11] 4,353,965

[45] Oct. 12, 1982

[54] ABRASION RESISTANT SILICONE COATED POLYCARBONATE ARTICLE HAVING AN ACRYLIC PRIMER LAYER CONTAINING A U.V. ABSORBING COMPOUND

[75] Inventors: Daniel R. Olson, Schenectady, N.Y.; John C. Goossens, Mt. Vernon, Ind.

[73] Assignee: General Electric Company, Pittsfield, Mass.

[21] Appl. No.: 106,263

[22] Filed: Dec. 21, 1979

[51] Int. Cl.³ .................. B32B 27/08; B32B 27/18; G02B 1/04
[52] U.S. Cl. .................. 428/412; 428/447; 428/448; 428/451
[58] Field of Search .............. 428/412, 447, 448, 451

[56] References Cited

U.S. PATENT DOCUMENTS

| 3,582,398 | 1/1971 | Ringler | |
|---|---|---|---|
| 3,707,397 | 12/1972 | Gagnon | |
| 3,968,305 | 7/1976 | Oshima et al. | 428/334 |
| 3,968,309 | 7/1976 | Matsuo et al. | 428/409 |
| 3,978,178 | 8/1976 | Oshima et al. | 264/25 |
| 3,986,997 | 10/1976 | Clark | 428/412 |
| 4,197,335 | 4/1980 | Goosens | 427/162 |
| 4,242,383 | 12/1980 | Goosens et al. | 428/412 |
| 4,243,720 | 1/1981 | Schroeter et al. | 428/412 |
| 4,308,317 | 12/1981 | Olson et al. | 428/412 |

Primary Examiner—James C. Cannon
Attorney, Agent, or Firm—William F. Mufatti

[57] ABSTRACT

A shaped, non-opaque coated polycarbonate article having improved abrasion and chemical solvent resistance comprising a polycarbonate substrate having disposed on the surface thereof a non-opaque primer layer comprised of from about 25 to about 85 weight percent of a thermoset acrylic polymer and from about 15 to about 75 weight percent of at least one ultraviolet light absorbing compound, and disposed on said primer layer a non-opaque top coat comprised of a thermoset organopolysiloxane.

8 Claims, No Drawings

ABRASION RESISTANT SILICONE COATED POLYCARBONATE ARTICLE HAVING AN ACRYLIC PRIMER LAYER CONTAINING A U.V. ABSORBING COMPOUND

This invention relates to non-opaque abrasion and chemical solvent resistant thermoset organopolysiloxane coated shaped polycarbonate articles wherein the organopolysiloxane top coat is uniformly and tenaciously adhered to the polycarbonate substrate. More particularly, the present invention relates to an organopolysiloxane coated polycarbonate article having a primer layer comprised of from about 25 to about 85 weight percent thermoset acrylic polymer and from about 15 to about 75 weight percent of at least one ultraviolet light absorbing compound disposed between the polycarbonate substrate and the organopolysiloxane top coat.

BACKGROUND OF THE INVENTION

The use of transparent glazing materials utilizing polycarbonate resin as a structural component for windows, windshields and the like are well known. While these polycarbonate resins are easily fabricated into the desired shape and have excellent physical and chemical properties, such as being less dense than glass and having more breakage resistance than glass, their abrasion and chemical solvent resistance is relatively low.

In order to overcome this relatively low abrasion resistance and to otherwise improve the surface characteristics of the polycarbonate, various coatings have been applied onto the polycarbonate substrates. U.S. Pat. No. 3,582,398 describes a fabricated polycarbonate part having improved optical properties consisting of a polycarbonate substrate having a transparent coating thereon consisting of a thermoplastic polymethylmethacrylate. U.S. Pat. No. 4,061,652 describes a coating for polycarbonate resins comprised of (i) an acrylic resin which is a mixture of olefinically unsaturated organic monomers in combination with an acrylic polymer, and (ii) certain urethanes of hydroxybenzotriazoles and hydroxybenzophenones in combination with certain catalysts. U.S. Pat. Nos. 3,451,838, 3,986,997 and 4,027,073 disclose organopolysiloxane coating compositions and techniques for the application of these organopolysiloxane coatings onto polycarbonate surfaces. While these coatings have many desirable properties, e.g., they are hard, abrasion resistant, and chemical solvent resistant, these organopolysiloxane coatings do not in all instances possess the requisite degree of uniform adherence to and durability on these polycarbonate surfaces. U.S. Pat. No. 3,707,397 describes a process for providing a hard coating on, inter alia, polycarbonate articles, said process including priming the polycarbonate surface with an adhesion promoting thermosettable acrylic and applying an organopolysiloxane onto the primed surface.

However, organopolysiloxane coated polycarbonate articles which contain a thermoset acrylic powder have faced the problem of rapid deterioration of the adhesion of the organopolysiloxane top coat to the primed polycarbonate substrate upon exposure to weathering.

It has now been discovered that, if the primer layer is loaded with high amounts of ultraviolet light absorbers, i.e., contains from about 15 to about 75 weight percent of at least one ultraviolet light absorber, then the adhesion of the organopolysiloxane top coat is not deleteriously affected upon exposure to weathering.

DESCRIPTION OF THE INVENTION

This invention relates to non-opaque organopolysiloxane coated polycarbonate articles having an adhesion promoting primer layer comprised of from about 25 to about 85 weight percent of a thermoset acrylic polymer and from about 15 to about 75 weight percent of at least one ultraviolet light absorbing compound disposed between the polycarbonate surface and the thermoset organopolysiloxane top coat.

In the practice of the present invention, prior to the application of the organopolysiloxane top coat to the polycarbonate surface, the surface is first primed by the application thereon of a primer layer of controlled thickness containing a thermoset acrylic polymer.

The aromatic carbonate polymers of the instant invention are known compounds and have recurring units of the formula:

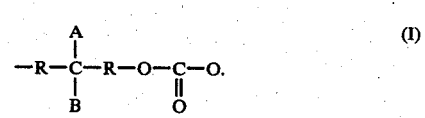

wherein each —R— is selected from the group consisting of phenylene, halo-substituted phenylene and alkyl substituted phenylene; and A and B are each selected from the group consisting of hydrogen, hydrocarbon radicals, free from aliphatic unsaturation and of radicals which together with the adjoining

atom form a cycloalkane radical, the total number of carbon atoms in A and B being up to 12.

These aromatic carbonate polymers may be prepared by methods well known in the art and described in U.S. Pat. Nos. 3,989,672, 3,275,601 and 3,028,365, all of which are incorporated herein by reference.

In the practice of this invention, any of the aromatic polycarbonates can be employed herein. However, particularly useful are the aromatic polycarbonates prepared by reacting a dihydric phenol, such as bisphenol-A (2,2-bis(4-hydroxyphenyl)propane) with a carbonate precursor. Typical of some of the dihydric phenols that may be employed in the practice of this invention are bis(4-hydroxyphenyl)methane, 2,2-bis(4-hydroxyphenyl)propane, 2,2-bis(4-hydroxy-3-methylphenyl)propane, 4,4-bis-(4-hydroxyphenyl)heptane, 2,2-(3,5,3',5'-tetrabromo-4,4'-dihydroxydiphenyl)propane, 2,2-(3,5,3',5'-tetrabromo-4,4'-dihydroxydiphenyl)propane, (3,3'-dichloro-4,4'-dihydroxydiphenyl)methane. Other dihydric phenols of the bisphenol type are also available and are disclosed in U.S. Pat. Nos. 2,999,835, 3,028,365 and 3,334,154.

In addition, the reaction is carried out with the carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

The thermosettable acrylic polymers which are contained in the primer compositions are well known in the art. Exemplary thermosettable acrylics which may be utilized in the practice of this invention are set forth in *Encyclopedia of Polymer Science and Technology*, Vol. 1, Interscience Publishers, John Wiley & Sons, Inc., at p. 273 et seq., and in the *Chemistry of Organic Film Formers*, by D. H. Solomon, John Wiley & Sons, Inc., 1967, at page 251 et seq., and the references cited therein, all of which are hereby incorporated herein by reference.

Generally, the term, thermosettable acrylics, as used herein includes an acrylic polymer or copolymer having reactive functional groups which are capable of reacting between themselves to effect a cross-linkage thereof. These functional groups may be the same, provided they are of the type which will react between themselves, or the polymer or copolymer may contain two or more different types of reactive functional groups, such as, for example, an epoxide group and a carboxyl group. The term, thermosettable acrylics, also includes acrylic polymers or copolymers having a reactive functional group to which there is added an appropriate cross-linking agent which reacts with the functional group to effect cross-linking. The term, thermosettable acrylics, still further includes a mixture of two or more polymers containing cross-linkable functional reactive groups. These polymers may be acrylic polymers or copolymers having reactable, cross-linkable, functional groups thereon, or at least one of the polymers may be an acrylic polymer or copolymer having a reactive functional group and the other polymer or copolymer may be one or more other types of known polymers having functional groups which are reactive with the acrylic functional group to provide the thermoset product as a result of cross-linking.

Typically, the reactions involved in cross-linking the thermosettable acrylic polymers are reactions between, for example, epoxide functional groups and amine functional groups; epoxide functional groups and acid anhydride functional groups; epoxide functional groups and carboxyl functional groups, including phenolic hydroxyl groups; epoxide functional groups and N-methylol or N-methylol-ether; carboxyl functional groups and N-methylol or N-methylol-ether functional groups; interreaction between carboxyl and isocyanate groups; reactions between hydroxyl, for example polyols, and isocyanate groups, and reactions between amine groups and N-methylol or N-methylol-ether groups. In the usual case of resin mixtures, the acrylic will be present in a major proportion, i.e., greater than 50 weight percent and, more typically, will be present in an amount in excess of about 70 percent. The needed functional group in the acrylic copolymer, which is the foundation of the thermosettable acrylic polymer, is provided by employing in the copolymerization a monomer which supplies the needed reactive functional group into the polymer chain. Usually, this copolymerizable functional group-supplying monomer will be present in small amounts, that is, on the order of 25 weight percent or less, and typically, between about 1 and 20 percent of the monomer mass which is polymerized. Exemplary of these functional group-supplying monomers are glycidyl acrylate, glycidyl methacrylate, allyl glycidyl ether, dimethylaminoethyl methacrylate, vinyl pyridine, tert-butyl-aminoethyl-methacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, maleamide, N-methylolmethacrylamide, vinyl isocyanate, allyl isocyanate. Usually, the other monomer which will be polymerized along with the monomer supplying the functional group is a lower ($C_1$–$C_3$) alkyl acrylic ester or mixtures thereof, e.g., methyl acrylate, ethyl acrylate, methyl methacrylate, ethyl methacrylate, or mixtures thereof, in an amount ranging between about 75 parts to about 99 parts and, more typically, between about 80 parts to about 97 parts.

The thermosettable acrylics are in general applied from primer compositions containing (i) the thermosettable acrylics and the ultraviolet light absorber dissolved in an organic or inorganic solvent, or (ii) an emulsion containing the thermosettable acrylics, the ultraviolet light absorber, an alcohol and water. In the case wherein the primer composition contains a thermosettable acrylic dissolved in an organic solvent, the solvent should generally be relatively volatile and inert, i.e., one that will not readily react with or too deleteriously affect the polycarbonate substrate, but which is capable of dissolving the thermosettable acrylic and the ultraviolet light absorbing compound.

The primer compositions contain sufficient thermosettable acrylic polymer and ultraviolet light absorber to provide a primer layer containing from about 25 to about 85 weight percent thermoset acrylic polymer and from about 15 to about 75 weight percent of the ultraviolet light absorbing compound. Generally, this requires that the primer compositions contain from about 1 to about 20 weight percent of thermosettable acrylic solids and a sufficient amount of an ultraviolet light absorbing system to provide a thermosettable acrylic solid to ultraviolet light absorber, weight ratio of from about 1:0.2 to about 1:3. The ultraviolet light absorbing system can be one which contains only one ultraviolet light absorbing compound or it can contain a mixture of two or more ultraviolet light absorbing or screening compounds.

The ultraviolet light absorbing compounds are well known in the art and are compounds which act to absorb or screen out the ultraviolet radiation. Illustrative of these compounds are those of the hydroxy benzophenone and benzotriazole series, the cyanoacrylates, and benzylidene malonates. Examples of these include: 2-hydroxy-4-n-octoxybenzophenone, substituted hydroxyphenylbenzotriazole, 2-(2'-hydroxy-5'-methylphenyl) benzotriazole, 2-hydroxy-4-methoxybenzophenone, 2,2'-dihydroxybenzophenone, 2,2',4,4'-tetrahydroxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-ethoxybenzophenone, 2,2'-dihydroxy-4-methoxy-4'-propoxybenzophenone, 2,2'-dihydroxy-4-methoxy-4'-butoxybenzophenone, 2-(2'-hydroxy-5'-tert-butylphenyl) benzotriazole, 2-(2'-hydroxy-3'-methyl-5'-tert-butylphenyl) benzotriazole, 2-(2'-hydroxy-5'-cyclohexylphenyl)benzotriazole, 2-(2'-hydroxy-3',5'-dimethylphenyl) benzotriazole, ethyl 3,3-diphenyl-2-cyanoacrylate, and octyl 3,3-diphenyl-2-cyanoacrylate. Further examples of ultraviolet light absorbers which may be used in the practice of this invention may be found in U.S. Pat. No. 3,043,709, which is incorporated herein by reference.

The primer compositions of the instant invention may also optionally contain various flatting agents, stabilizers such as antioxidants, surface-active agents and thixotropic agents. All of these additives and the use thereof are well known in the art and do not require extensive discussions. Therefore, only a limited number will be referred to, it being understood that any compounds possessing the ability to function in such a manner, i.e., as a flatting agent, surface active agents and stabilizing agents can be used.

The various surface-active agents, including anionic, cationic and nonionic surface-active agents are described in *Kirk-Othmer Encyclopedia of Chemical Technology*, Vol. 19, Interscience Publishers, New York, 1969, pp. 507–593, and *Encyclopedia of Polymer Science and Technology*, Vol. 13, Interscience Publishers, New York, 1960, pp. 477–486, both of which are references and incorporated herein.

A uniform film of the primer composition containing the further curable thermosettable acrylic and the ultraviolet light absorbing system is applied onto the polycarbonate surface by any of the known means such as dipping, spraying, roll-coating and the like. After the formed polycarbonate part is coated with the primer composition, the inert volatile solvent is removed by drying the coated article until a substantial portion of the volatile solvent evaporates leaving a solid residue, and thereafter heat is applied to thermoset the thermosettable acrylic, thereby forming a primer layer or coating containing the thermoset acrylic and the ultraviolet light absorbing system on the polycarbonate surface to which the primer composition was applied. This primer layer contains from about 25 to about 85 weight percent of the thermoset acrylic polymer and from about 15 to about 75 weight percent of the ultraviolet light absorbing system, i.e., at least one ultraviolet light absorbent compound; preferably from about 25 to about 80 weight percent of the thermoset acrylic polymer and from about 20 to about 75 weight percent of the ultraviolet light absorbing system; more preferably from about 25 to about 75 weight percent of the thermoset acrylic polymer and from about 25 to about 75 weight percent of the ultraviolet light absorbing system; and most preferably from about 25 to about 70 weight percent of the thermoset acrylic polymer and from about 30 to about 75 weight percent of the ultraviolet light absorbing system.

Generally, if less than about 15 weight percent of the ultraviolet light absorber is present in the primer layer, there is no appreciable improvement upon the durability of adhesion of the silicone top coat. If the primer layer contains more than about 75 weight percent of an ultraviolet light absorber, the adhesion promoting properties of the primer begin to be deleteriously affected.

After the polycarbonate article which is to be coated with the top coat composition has been primed by the application of the primer composition and the evaporation of the solvent component of the primer composition and the thermosetting of the thermosettable acrylic, the primed surface of the polycarbonate article is then coated with the thermosettable organopolysiloxane top coating. In the practice of this invention, an organopolysiloxane coating composition containing a further curable organopolysiloxane is applied onto the cured primer and is then cured to form a thermoset organopolysiloxane coating.

The further-curable organopolysiloxane used in the practice of the instant invention is the partial hydrolysis and condensation product of at least one compound represented by the general formula $$R^2{}_n SiZ_{(4-n)} \qquad \text{II.}$$

wherein $R^2$ represents a monovalent hydrocarbon radical and a halogenated monovalent hydrocarbon radical, Z represents a hydrolyzable group and n may vary from 0 to 2. More specifically, Z is independently a member such as halogen, alkoxy, acyloxy and aryloxy.

Preferably, $R^2$ represents an alkyl radical containing from 1 to about 8 carbon atoms such as methyl, ethyl, and propyl through octyl (both normal and isomeric), an alkenyl radical containing from 2 to about 8 carbon atoms, such as vinyl and the normal and isomeric forms of propenyl through octenyl, and the phenyl radical; Z preferably represents an alkoxy radical containing from 1 to about 8 carbon atoms such as methoxy, ethoxy, propoxy, heptoxy, octoxy and the like, an acyloxy radical containing from 2 to about 9 carbon atoms such as acetoxy, propionoxy, butyroxy, pentanoxy, hexanoxy, and the like, and a phenoxy radical; and n varies from 0 to 2.

Preferred compounds of formula II are silanes of the formula $$R^3{}_a Si(OR^4)_{4-a} \qquad \text{III.}$$

and silanes of the formula $$R^5{}_b Si(OCOR^6)_{4-b} \qquad \text{IV.}$$

wherein $R^3$ and $R^5$ represent a monovalent hydrocarbon radical and a halogenated monovalent hydrocarbon radical, preferably an alkyl radical containing from 1 to about 8 carbon atoms, an alkenyl radical containing from 2 to about 8 carbon atoms, and the phenyl radical; $R^4$ and $R^6$ represent monovalent hydrocarbon radicals and halogenated monovalent radicals such as alkyl radicals and phenyl radicals, but are preferably alkyl radicals of 1 to 8 carbon atoms; a is 0 or 1; and b varies from 0 to 2.

Upon hydrolysis, the compounds of formula II, and more specifically those of formulae III and IV, are converted to the corresponding silanols. Upon generation of the silanol, there is condensation of the hydroxyl substituents to form —Si—O—Si— bonding. The condensation is not complete, but rather the organopolysiloxane retains a quantity of silicon-bonded hydroxyl group. This partial condensate can be characterized as a further-curable, i.e., further condensable, siloxanol polymer.

The further-curable organopolysiloxane may be formulated into the top-coat composition as a solution of the further-condensable siloxanol polymer in water and alcohol by-product as a concentrated solution of further-condensable siloxanol in water and alcohol by-product formed by evaporating off a substantial quantity of the alcohol by-product and water, or it may be formulated onto the top-coat composition as a solid partially pre-cured product by evaporating off a substantial amount of alcohol by-product and water and then partially precuring and solidifying the concentrated product.

Examples of good silicone top coats are the foregoing alkoxy and aryloxy functional silanes represented by formula III and acyloxy functional silanes represented by formula IV. Such alkoxy functional, aryloxy functional, and acyloxy functional silanes are well known materials to silicone manufacturers and are easily obtainable.

With respect to the acyloxy functional silanes, these materials are generally applied without any solvent since it has been found that the use of solvents in the application of such top coats at times seriously degrades the applied silicone top coat. Preferably, the silanes of Formula IV, that is the acyloxy functional silanes, are applied at 100% solids or from 20 to 100% solids, in the case of the acyloxy silanes where the solids are less than 100% the silane is simply the water hydrolysis and partial condensation product of the foregoing acyloxy functional silanes of Formula IV. The alkoxy and aryloxy functional silanes of Formula III are generally applied from a top-coat composition containing solvents in a solids concentration of from about 20 to 95% by weight. Examples of solvents which may be used in the formulation of the top-coat composition include methanol, ethanol, butanol, ethyl acetate, benzene, toluene, xylene, ethylene glycol and the like. However, the alkoxy and aryloxy functional silanes may also, similarly to the acyloxy functional silanes, be applied from a topcoat composition which contains no solvents other than the alcohol by-product and water used to form the partial hydrolysis and condensation products of these silanes.

With respect to the foregoing aryloxy functional, alkoxy functional and acyloxy functional silanes mentioned above, such materials are well known in the art as, for instance, in U.S. Pat. Nos. 3,888,815 and 3,701,753, both of which are incorporated herein by reference.

One particular class of further-curable organopolysiloxanes which are employed in the top-coat compositions of the present invention are the partial hydrolysis and condensation products of alkoxy functional silanes, preferably alkyltrialkoxysilanes, preferably those alkyltrialkoxysilanes wherein the alkyl group contains from 1 to about 8 carbon atoms, and aryltrialkoxysilanes, preferably phenyltrialkoxysilanes, or mixtures thereof, wherein the alkoxy group contains from 1 to about 8 carbon atoms, such as, for example, methoxy, ethoxy, isopropoxy, butoxy, pentoxy, hexoxy, octoxy, and the like. The further-curable organopolysiloxanes are generally prepared by a process wherein the alkyltrialkoxysilane, aryltrialkoxysilane, or a mixture of alkyltrialkoxysilane and aryltrialkoxysilane is heated in the presence of water, wherein the molar ratio of water to total silane is at least about 1.5:1 and in the presence of an effective amount of a hydrolysis catalyst, such as a mineral acid, for example, HCl, for about 1 to about 10 hours at a temperature between ambient and reflux to produce a siloxane partial condensation product; the partial condensation product is then concentrated by heating to remove 50 to about 90 mole percent alkanol by-product and some water, and thereafter, the concentrated partial condensation product is precured by heating at a temperature below the gel point thereof and generally in the range of about 70° to 300° C. to produce the solvent-soluble, further curable organopolysiloxane. This precured solvent-soluble, further curable organopolysiloxane is then dissolved in a suitable solvent to form the top-coat composition and the primed polycarbonate substrate is then coated with this top coat composition. The solvent is then evaporated and the residual further-curable organopolysiloxane is cured to a thermoset state to provide a uniformly and tenaciously adhered top coat on the primed polycarbonate substrate. The curing is effected at elevated temperatures in the range of about 50° to 135° C. for times between about 1 hour to about 72 hours, depending on the temperature at which the cure is effected. The silicone top coat generally should be cured preferably at an elevated temperature to effect the proper cure, but the temperature should be below the glass transition temperature of the polycarbonate. Of course, if the glass transition temperature of the polycarbonate is exceeded, then the polycarbonate part may become deformed and lose its utility.

One particular further curable organopolysiloxane that can be employed in the top coat composition of the instant invention is the partial hydrolysis and condensation product of methyltriethoxysilane. This further-curable organopolysiloxane is prepared by hydrolyzing methyltriethoxysilane with water in the presence of an effective amount of a hydrolysis catalyst, such as HCl, for about 1 to 10 hours at a temperature generally between 40° C. and reflux temperature, to produce a partial condensation product. This partial condensation product is then concentrated by heating to remove some of the alkanol by-product and water. This concentrated product is then partially pre-cured at a temperature of about 70° to about 300° C. and below the gel point thereof and then solidified to provide a solid, solvent-soluble, further curable organopolysiloxane. The solid, solvent-soluble, further-curable organopolysiloxane is then dissolved to a desired concentration in a suitable solvent to form the top coat composition. The top coat composition is then applied to the primed polycarbonate substrate, after which the solvent is evaporated and the further-curable organopolysiloxane finally cured to provide a hard, abrasion and chemical solvent resistant, thermoset organopolysiloxane top coat in the polycarbonate substrate.

Another further-curable organopolysiloxane which may be employed in the practice of the present invention is the partial hydrolysis and condensation product of a mixture of methyltriethoxysilane and phenyltriethoxysilane. This organopolysiloxane is prepared by hydrolyzing a mixture of methyltriethoxysilane and phenyltriethoxysilane with water in the presence of a hydrolysis catalyst such as HCl to produce a partial condensation product. This partial condensation product is then concentrated by heating to remove a substantial amount of the alkanol by-product and some water. This concentrated product is then partially pre-cured by heating and then solidifed to provide a solid, solvent-soluble, further-curable organopolysiloxane. The solid, solvent-soluble, further-curable organopolysiloxane is then dissolved to a desired concentration in a suitable solvent to form the top-coat composition containing a further-curable organopolysiloxane. The top-coat composition is then applied to the primed polycarbonate substrate, after which the solvent is evaporated and the further-curable organopolysiloxane is finally cured to provide a tenaciously and durably adhered, abrasion and chemical resistant thermoset organopolysiloxane top coat on the polycarbonate substrate.

These are not the only silicones that may be utilized in the top coats of the instant invention. Less preferred silicones which can be utilized to form the top coats of the present invention are, for instance, silicone resins composed of trifunctional and difunctional units, silicone resins composed of trifunctional units, difunctional units and tetrafunctional units when the organo substituent groups in the trifunctional units may be selected from hydrocarbon radicals of 1 to about 8 carbon atoms and are preferably methyl, phenyl and vinyl; and wherein the organo substituent groups in the difunctional siloxy units may be selected from hydrocarbon units of from 1 to about 8 carbon atoms, preferably alkyl radicals, vinyl radicals and phenyl radicals. Such silicone resins usually have an organic radical to silicon atom ratio of 1:1 to 1.9:1; may have a silanol content that varies anywhere from 4 to 10 weight percent and optionally may have an alkoxy content that varies from 2 to 4%. The preparations of such silicone resins which may be utilized as top coats in the invention of the instant case are, for instance, to be found in U.S. Pat. Nos. 3,375,223, 3,435,001, 3,450,672, 3,790,527, 3,832,319, 3,865,766, 3,887,514 and 3,925,276.

These silicones may also contain various fillers such as, for example, glass fibers, talc and silica, preferably colloidal silica.

The top-coat compositions containing the afore-described silicones are simply brushed, dipped, sprayed or flowed on top of the primer layer that is applied to the polycarbonate substrate. The solvent, or alcohol by-product and water, present in the top-coat composition is evaporated and the residual further-curable organopolysiloxane is cured to form a thermoset organopolysiloxane top coat. Preferably, the further-curable organopolysiloxane is cured at elevated temperatures. Although certain catalysts may be utilized to accelerate the cure of the further-curable organopolysiloxane, such catalysts are not necessary if the further-curable organopolysiloxane is cured by itself at the elevated temperature for a sufficient length of time.

PREFERRED EMBODIMENT OF THE INVENTION

In order that those skilled in the art may better understand how the present invention may be practiced, the following examples are given by way of illustration and not by way of limitation. In the Examples set forth below, all parts and percentages, unless otherwise indicated, are on a weight basis.

EXAMPLE 1

An aromatic polycarbonate is prepared by reacting 2,2-bis(4-hydroxyphenyl)propane and phosgene in the presence of an acid acceptor and a molecular weight regulator and having an intrinsic viscosity of 0.57. The product is then fed to an extruder, which extruder is operated at about 265° C. and the extrudate is comminuted into pellets.

The pellets are then injection molded at about 315° C. into test panels of about 4 in. by 4 in. by about ⅛ in. thick.

A further curable organopolysiloxane top coat composition is prepared as follows: To 100 parts by weight of a commercially available solution containing a further-curable organopolysiloxane dissolved in a suitable solvent is added 2 parts by weight of a commercially available curing catalyst solution to form a top-coat composition. This further-curable organopolysiloxane is available from Resart-Ihm A.G., Mainz, Federal Republic of Germany, as their Resarix SF/PC ® and is a solution containing about 32 weight percent of a partial hydrolysis and condensation product of methyl triethoxysilane dissolved in an ethanol-tetrahydrofuran-n-butanolethoxyethanol solvent system. The catalyst consists of a solution containing 2 weight percent of tetraethylammonium hydroxide dissolved in methanol.

EXAMPLE 2

This Example illustrates a primed, top coated polycarbonate article falling outside the scope of the instant invention in that no ultraviolet light absorbing compound is present in the primer layer.

A solution of 120 parts by weight of freshly distilled methyl methacrylate, 2 parts by weight of methacrylic acid, 0.03 parts by weight of dodecanethiol, and 0.15 parts by weight of 2,2'-azobisisobutyronitrite in 360 parts by weight of butoxyethanol is stirred under nitrogen at 100° C. for 24 hours.

A thermosettable acrylic primer formulation, hereinafter referred to as "primer formulation A," is made by combining 10 parts by weight of the afore-prepared solution, 0.12 parts by weight of a cycloaliphatic diepoxide, 0.01 parts by weight of toluenesulfonic acid, and 1 drop of a flow agent in 32 parts by weight of butoxyethanol and 14 parts by weight of ethylene glycol diacetate.

Polycarbonate test panels prepared in accordance with the procedure of Example 1 are flow coated with this primer formulation A, are drained for 10 minutes, and then are baked at 125° C. for 15 minutes. After cooling, the primed test panels are flow coated with the organopolysiloxane top coat composition prepared substantially in accordance with the procedure set forth above. Excess top coat solution is drained off and the panels are air dried for 30 minutes. The panels are then baked for 1 hour at 125° C. to effect the cure of the further curable organopolysiloxane. The primed and top coated test panels are subjected to an adhesion test, both before and after weathering, and the results are set forth in TABLE I. The adhesion test consists of using a multiple blade tool to cut parallel grooves about 1 mm apart through the coating into the substrate, rotating the sample 90° and repeating the cutting process thereby forming a grid pattern of 1 mm squares cut into the coating, and applying an adhesive tape over the crosshatched area and quickly pulling said tape off. A sample fails the adhesion test if any of the squares in the grid are pulled off. The weathering consists of placing the test panels in a QUV accelerated weathering tester, sold by Q-Panel Company, which is set to cycles of 4 hours of fluorescent ultraviolet light at about 60° C. and 4 hours of dark/condensation at about 45° C.

EXAMPLE 3

A thermosettable acrylic primer formulation containing a high amount of a benzotriazole ultraviolet light absorber is prepared by combining 56 parts by weight of the thermosettable acrylic primer formulation A of Example 2 with 3 parts by weight of Cyosorb 5411 (a benzotriazole ultraviolet light absorber sold by American Cyanamid). Test panels prepared in accordance with the procedure of Example 1 are primed with this primer formulation and top coated in accordance with the procedure of Example 2. These primed and top coated test panels are subjected to the adhesion test, before and after weathering, and the results are set forth in TABLE I.

EXAMPLE 4

A thermosettable acrylic primer formulation containing a high amount of dihydroxybenzophenone ultraviolet light absorber is prepared by combining 56 parts by weight of the thermosettable acrylic primer formulation A of Example 2 with 3.5 parts by weight of 2,4-dihydroxybenzophenone. Test panels prepared in accordance with the procedure of Example 1 are primed with this primer formulation and top coated in accordance with the procedure of Example 2. These primed and top coated test panels are subjected to the adhesion test, before and after weathering, and the results are set forth in TABLE I.

EXAMPLE 5

A thermosettable acrylic primer formulation containing a high amount of a benzophenone ultraviolet light absorber is prepared by combining 56 parts by weight of the thermosettable acrylic primer formulation A of Example 2 with 3.5 parts by weight of Cyasorb 531 (a benzophenone ultraviolet light absorber sold by American Cyanamid). Test panels prepared in accordance with the procedure of Example 1 are primed with this primer formulation and top coated in accordance with the procedure of Example 2. These primed and top coated test panels are subjected to the adhesion test, before and after weathering, and the results are set forth in TABLE I.

EXAMPLE 6

A thermosettable acrylic primer formulation containing a high amount of a cyanoacrylate ultraviolet light absorber is prepared by combining 56 parts by weight of the thermosettable acrylic primer formulation A of Example 2 with 3.5 parts by weight of Uvinul N-539 (a cyanoacrylate ultraviolet light absorber sold by GAF Corporation). Test panels prepared in accordance with the procedure of Example 1 are primed with this primer formulation and top coated in accordance with the procedure of Example 2. These primed and top coated test panels are subjected to the adhesion test, before and after weathering, and the results are set forth in TABLE I.

EXAMPLE 7

A thermosettable acrylic primer formulation containing a high amount of a benzylidene malonate ultraviolet light absorber is prepared by combining 56 parts by weight of the thermosettable acrylic primer formulation A of Example 2 with 3.5 parts by weight of Cyasorb UV-1988 (a benzylidene malonate ultraviolet light absorber sold by American Cyanamid). Test panels prepared in accordance with the procedure of Example 1 are primed with this primer formulation and top coated in accordance with the procedure of Example 2. These primed and top coated test panels are subjected to the adhesion test, before and after weathering, and the results are set forth in TABLE I.

EXAMPLE 8

This Example illustrates a primed and top coated polycarbonate article falling outside the scope of the instant invention in that no ultraviolet light absorbing compound is present in the primer layer.

A solution of 20 parts by weight of methyl methacrylate, 20 parts by weight of ethyl methacrylate, 0.6 parts by weight of methacrylic acid and 0.1 parts by weight of 2,2'-azobisisobutyronitrile in 160 parts by weight of butoxyethanol is stirred under nitrogen at 100° C. for 36 hours.

A thermosettable acrylic primer formulation, hereinafter referred to as "primer formulation B," is made by combining 40 parts by weight of the afore-described solution with 0.5 parts by weight of hexamethoxymethylmelamine, 0.03 parts by weight of toluene-sulfonic acid, and 160 parts by weight of butoxy ethanol.

Polycarbonate test panels prepared in accordance with the procedure of Example 1 are flow coated with this primer formulation B, are drained for 10 minutes, and then are baked at 125° C. for 30 minutes. After cooling the primed test panels are flow coated with the organopolysiloxane top coat composition prepared substantially in accordance with the procedure set forth above. Excess top coat solution is drained off and the panels are air dried for 30 minutes. The panels are then baked for 1 hour at 125° C. to cure the further curable organopolysiloxane. The primed and top coated test panels are subjected to an adhesion test, before weathering, after weathering for 144 hours, and after weathering for 503 hours, and the results are set forth in TABLE II.

EXAMPLE 9

This Example illustrates a primed and top coated polycarbonate article falling outside the scope of the instant invention in that the primer layer contains about 9 weight percent of an ultraviolet light absorber.

A thermosettable acrylic primer formulation containing a low amount of a benzotriazole ultraviolet light absorber is prepared by combining 20 parts by weight of the thermosettable acrylic primer formulation B of Example 8 with 0.08 parts by weight of Cyasorb 5411 (a benzotriazole ultraviolet light absorber sold by American Cyanamid). Test panels prepared in accordance with the procedure of Example 1 are primed with this primer formulation and top coated in accordance with the procedure set forth in Example 8. These primed and top coated test panels are subjected to the adhesion test, before and after weathering, and the results are set forth in TABLE II.

EXAMPLE 10

A thermosettable acrylic primer formulation containing a high amount of dihydroxybenzophenone ultraviolet light absorber is prepared by combining 19.8 parts by weight of the thermosettable acrylic primer formulation B of Example 8 with 2.2 parts by weight of 2,4-dihydroxybenzophenone. Test panels prepared in accordance with the procedure of Example 1 are primed with this primer formulation and top coated in accordance with the procedure set forth in Example 8. These primed and top coated test panels are subjected to the adhesion test, before and after weathering, and the results are set forth in TABLE II.

EXAMPLE 11

A thermosettable acrylic primer formulation containing a high amount of benzotriazole ultraviolet light absorber is prepared by combining 19.95 parts by weight of the thermosettable acrylic primer formulation B of Example 8 with 1.05 parts by weight of Cyasorb UV-1988 (a benzotriazole ultraviolet light screener sold by American Cyanamid). Test panels prepared in accordance with the procedure of Example 1 are primed with this primer formulation and top coated in accordance with the procedure set forth in Example 8. These primed and top coated test panels are subjected to the adhesion test, before and after weathering, and the results are set forth in TABLE II.

TABLE I

| Example | Adhesion Test Before Weathering | Adhesion Test After 144 Hrs. Weathering | Color of Test Panel After 144 Hours Weathering |
|---|---|---|---|
| 2 | Pass | Fail | Yellow |
| 3 | Pass | Pass | Colorless |
| 4 | Pass | Pass | Colorless |
| 5 | Pass | Pass | Colorless |
| 6 | Pass | Pass | Colorless |
| 7 | Pass | Pass | Colorless |

TABLE II

| Example | Adhesion Test Before Weathering | Adhesion Test After 144 Hours of Weathering | Adhesion Test After 503 Hours of Weathering | Color of Test Panel After 144 Hours Weathering |
|---|---|---|---|---|
| 8 | Pass | Fail | Fail | Yellow |
| 9 | Pass | Marginal | Fail | Yellow |
| 10 | Pass | Pass | Pass | Colorless |
| 11 | Pass | Pass | Pass | Colorless |

As can be seen by comparison of Examples 2 and 8 with Examples 3–7 and 10–11 in TABLES I and II above, the adhesion of the thermoset organopolysiloxane containing top coat composition to polycarbonate panels primed with a primer containing a thermoset acrylic primer but no ultraviolet light screener rapidly deteriorates upon exposure to weathering, while the adhesion of the top coat to a primer containing relatively high amounts of ultraviolet light screener is not deleteriously affected by weathering. Example 9, in which the primer layer contains 9 weight percent of an ultraviolet light screener, shows that the presence of relatively small amounts of ultraviolet light screener in the primer layer is ineffective in remedying the problem of adhesive failure of the top coat upon exposure to weathering.

While the invention has been described above with particularity, it will, of course, be apparent that modifications may be made which, pursuant to the patent statutes and laws, do not depart from the spirit and scope of the invention.

What we claim as new and desire to secure by Letters Patent of the United States is:

1. In an improved coated poycarbonate article having abrasion and chemical solvent resistance and exhibiting improved adhesion and weatherability of the coating to the polycarbonate substrate comprising a polycarbonate substrate having adhered thereto on at least one surface thereof (i) an adhesion promoting thermoset acrylic primer layer; and (ii) a top coat adherently disposed on said primer layer comprised of a thermoset organopolysiloxane; the improvement consisting of said primer layer consisting essentially of from about 25 to about 85 weight percent of at least one thermoset acrylic polymer and from about 15 to about 75 weight percent of at least one ultraviolet light screening compound.

2. The article of claim 1 wherein said primer layer contains from about 25 to about 80 weight percent of a thermoset acrylic polymer and from about 20 to about 75 weight percent of at least one ultraviolet light screening compound.

3. The article of claim 2 wherein said primer layer contains from about 25 to about 75 weight percent of a thermoset acrylic polymer and from about 25 to about 75 weight percent of at least one ultraviolet light screening compound.

4. The article of claim 3 wherein said primer layer contains from about 25 to about 70 weight percent of a thermoset acrylic polymer and from about 30 to about 75 weight percent of at least one ultraviolet light screening compound.

5. The article of claim 4 wherein said thermoset organopolysiloxane is the hydrolysis and condensation product of an alkyl trialkoxysilane.

6. The article of claim 5 wherein said alkyl trialkoxysilane is an alkyl triethoxysilane.

7. The article of claim 6 wherein said trialkoxysilane is a methyl trialkoxysilane.

8. The article of claim 7 wherein said methyl trialkoxysilane is methyl triethoxysilane.

* * * * *